(12) United States Patent
Tanimoto

(10) Patent No.: US 9,631,670 B2
(45) Date of Patent: Apr. 25, 2017

(54) ROLLING BEARING APPARATUS AND LUBRICATION UNIT

(71) Applicant: JTEKT CORPORATION, Osaka-shi, Osaka (JP)

(72) Inventor: Kiyoshi Tanimoto, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 31 days.

(21) Appl. No.: 14/801,724

(22) Filed: Jul. 16, 2015

(65) Prior Publication Data

US 2016/0025141 A1 Jan. 28, 2016

(30) Foreign Application Priority Data

Jul. 23, 2014 (JP) .................................. 2014-149651

(51) Int. Cl.
*F16C 33/66* (2006.01)

(52) U.S. Cl.
CPC ................................ *F16C 33/6651* (2013.01)

(58) Field of Classification Search
CPC ........................ F16C 33/6651; F16C 33/6659
See application file for complete search history.

(56) References Cited

U.S. PATENT DOCUMENTS

| 7,832,937 B2 * | 11/2010 | Suzuki ............... F16C 33/6674 |
| | | 184/11.2 |
| 2006/0165328 A1 | 7/2006 | Ueno et al. |
| 2009/0148087 A1* | 6/2009 | Suzuki ............... F16C 33/3806 |
| | | 384/462 |
| 2014/0341490 A1 | 11/2014 | Ito et al. |

FOREIGN PATENT DOCUMENTS

| EP | 2 886 893 A1 | 6/2015 |
| JP | 2004-108388 A | 4/2004 |
| JP | 2009-058091 A | 3/2009 |
| JP | 2013-083335 A | 5/2013 |
| JP | 2013-104529 A | 5/2013 |
| JP | 2014-037879 A | 2/2014 |

* cited by examiner

*Primary Examiner* — Thomas R. Hannon
(74) *Attorney, Agent, or Firm* — Oliff PLC

(57) ABSTRACT

A lubrication unit in a rolling bearing apparatus includes a pump that supplies a lubricant to an annular space formed between an inner ring and an outer ring, and is provided adjacently to the annular space. The pump includes a needle-like nozzle having, at a tip thereof, a discharge port through which the lubricant is discharged toward an outer ring raceway groove in an outer ring. A tip of the nozzle is in contact with a shoulder portion inner peripheral surface adjacent to the outer ring raceway groove or is provided close to the shoulder portion inner peripheral surface such that a very small gap is formed between the tip and the shoulder portion inner peripheral surface.

16 Claims, 12 Drawing Sheets

ROLLING BEARING APPARATUS AND LUBRICATION UNIT

INCORPORATION BY REFERENCE

The disclosure of Japanese Patent Application No. 2014-149651 filed on Jul. 23, 2014 including the specification, drawings and abstract, is incorporated herein by reference in its entirety.

BACKGROUND OF THE INVENTION

1. Field of the Invention

The present invention relates to a rolling bearing apparatus with a supply unit that supplies a slight amount of lubricant to a bearing portion and a lubrication unit that supplies a slight amount of lubricant to rotating components such as a rolling bearing.

2. Description of Related Art

Rolling bearings are used as spindle bearings for machine tools. Some rolling bearings adopt oil-air lubrication in order to ensure appropriate lubrication of the rolling bearing (see, for example, Japanese Patent Application Publication No. 2009-58091 (JP 2009-58091 A)). However, the oil-air lubrication involves high running costs due to air consumption and needs incidental facilities such as an oil-air supply apparatus and an air clean unit, possibly leading to high facility costs.

As another means for lubricating a rolling bearing, a bearing apparatus incorporating a lubrication unit is known (see, for example, Japanese Patent Application Publication No. 2004-108388 (JP 2004-108388 A)). In the bearing apparatus, an annular lubrication unit is installed on a fixed bearing ring (fixed ring) of an inner ring and an outer ring, and the rolling bearing and the lubrication unit are integrated together. The lubrication unit includes a tank in which a lubricant is stored and a pump that discharges the lubricant in the tank into an annular space between the inner ring and the outer ring.

A slight amount of lubricant is discharged from the pump. The amount of lubricant discharged is adjusted by controlling operations of the pump. The lubricant is intermittently (at time intervals) discharged by the pump in the form of droplets. The amount of lubricant discharged from the pump during a single operation is, for example, several picoliters to several hundred nanoliters. In a bearing apparatus including such a lubrication unit as described above along with a rolling bearing, a slight amount of lubricant can be discharged into the annular space formed between the inner ring and the outer ring. The discharged lubricant adheres to raceway surfaces of the inner and outer rings and to rolling elements, thus allowing the rolling bearing to be lubricated.

In a bearing apparatus including such a lubrication unit as described above, for example, the outer ring is fixed to a bearing housing, and when the inner ring rotates integrally with the rotary shaft, rolling elements and a cage also rotate in the same direction. Thus, in a gas in an annular space between the inner ring and the outer ring, a vortex flow in the same direction as the rotating direction of the cage is generated. When a slight amount of lubricant as described above is discharged into the annular space where such a vortex flow occurs, the slight amount of lubricant may be affected by the vortex flow and precluded from reaching the raceway surface and the rolling elements. In other words, the arrival of the lubricant on the raceway surface may be hindered by the environment in the annular space, making the desired supply of the lubricant to the raceway surface difficult.

SUMMARY OF THE INVENTION

An object of the present invention is to provide a rolling bearing apparatus and a lubrication unit that allow a lubricant to be efficiently supplied to a raceway surface (lubrication-needed area).

A rolling bearing apparatus according to an aspect of the present invention includes: a bearing portion having an inner ring with a raceway surface on an outer periphery thereof, an outer ring with a raceway surface on an inner periphery thereof, a plurality of rolling elements interposed between the inner ring and the outer ring and rolling on the raceway surfaces, and a cage that holds the rolling elements such that the rolling elements are arranged in a circumferential direction; and a lubrication unit having a pump that supplies a lubricant to an annular space formed between the inner ring and the outer ring. The lubrication unit is provided adjacently to the annular space. The pump includes a needle-like nozzle having, at a tip thereof, a discharge port through which the lubricant is discharged toward the raceway surface of a non-rotating fixed bearing ring of the inner ring and the outer ring. A tip of the nozzle is in contact with a peripheral surface adjacent to the raceway surface or is provided close to the peripheral surface adjacent to the raceway surface such that a very small gap is formed between the tip and the peripheral surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
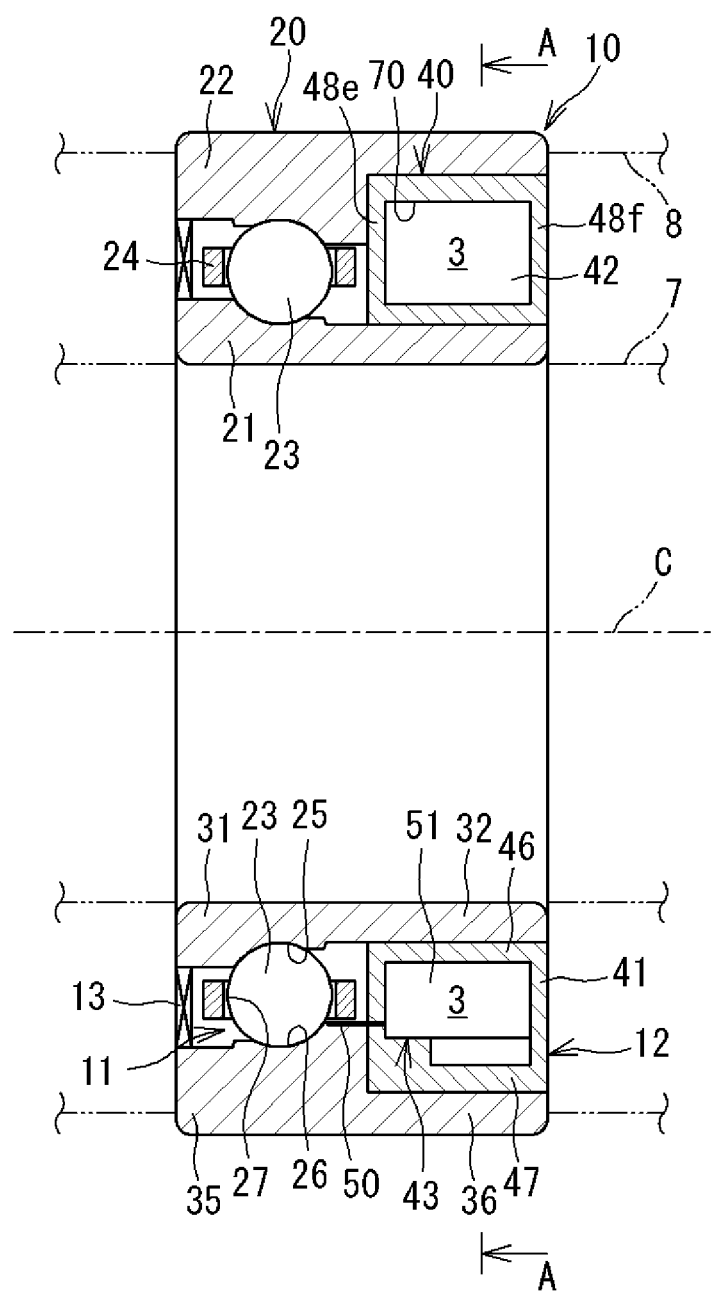
FIG. 1 is a longitudinal sectional view of a rolling bearing apparatus.
Figure 2:
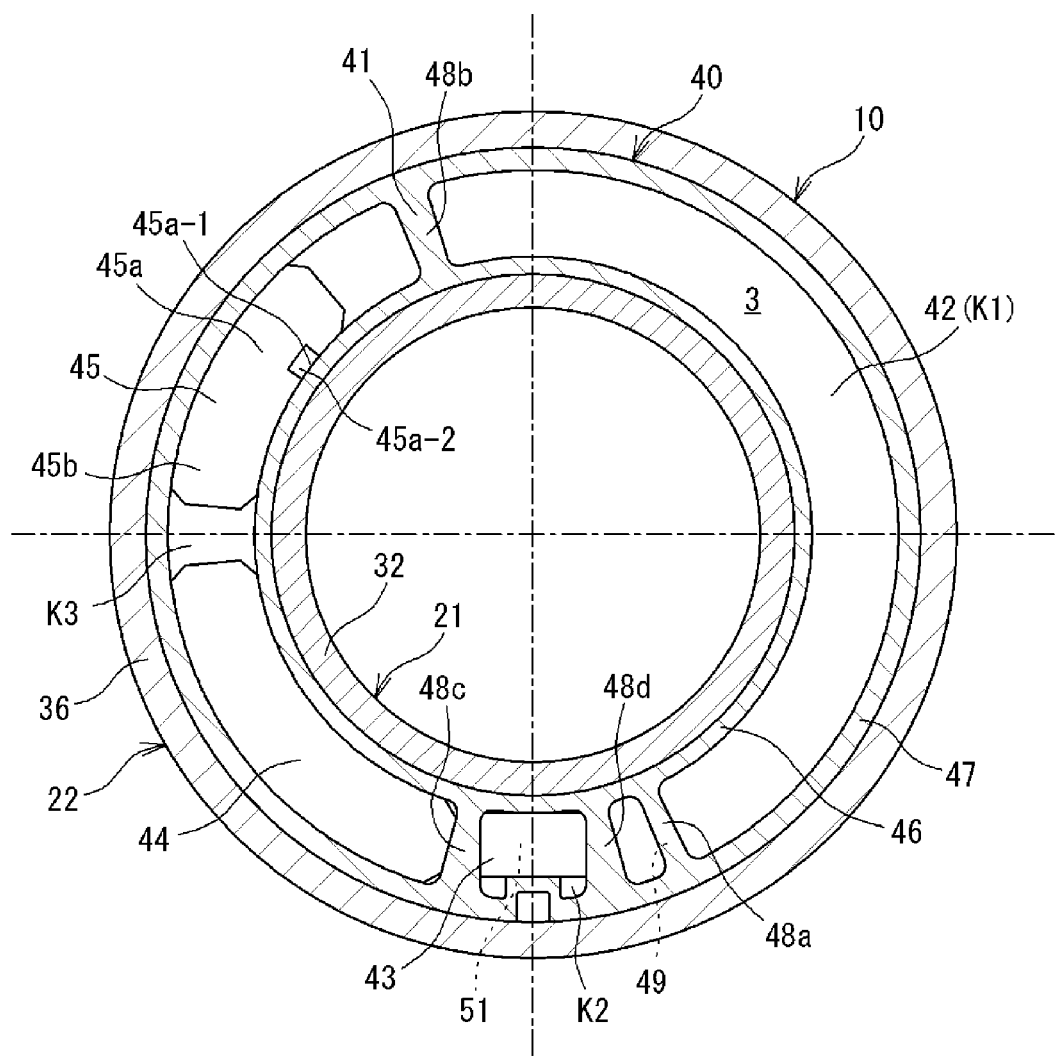
FIG. 2 is a transverse sectional view of the rolling bearing apparatus depicted in FIG. 1.

An embodiment of a rolling bearing apparatus will be described. FIG. 1 is a longitudinal sectional view of a rolling bearing apparatus 10. FIG. 2 is a transverse sectional view of the rolling bearing apparatus 10 depicted in FIG. 1. FIG. 2 is a cross-sectional view taken along line A-A in FIG. 1. As depicted in FIG. 1, the rolling bearing apparatus 10 includes a bearing portion 20 and a lubrication unit 40. The rolling bearing apparatus 10 in the present embodiment is housed in a bearing housing 8 in order to support a spindle (shaft 7) of a machine tool so as to enable rotation of the spindle.

The bearing portion 20 has an inner ring 21, an outer ring 22, a plurality of balls (rolling elements) 23, and a cage 24 that holds the balls 23. The inner ring 21 includes a cylindrical member externally fitted over the shaft 7. The inner ring 21 has an inner ring main body portion 31 on a first side in an axial direction (in FIG. 1, the left side) and an inner ring extension portion 32 on a second side in the axial direction (in FIG. 1, the right side). As a raceway surface, a raceway groove (hereinafter referred to as an inner ring raceway groove 25) is formed on an outer periphery of the inner ring main body portion 31. In the present embodiment, the inner ring main body portion 31 and the inner ring extension portion 32 are integrated together and are indivisible but may be separate from each other. In other words, the inner ring extension portion 32 may be a ring-shaped spacer. The outer ring 22 includes a cylindrical member fixed to an inner peripheral surface of the bearing housing 8. The outer ring 22 has an outer ring main body portion 35 on the first side in the axial direction and an outer ring extension portion 36 on the second side in the axial direction. As a raceway surface, a raceway groove (hereinafter referred to as an outer ring raceway groove 26) is formed on an inner periphery of the outer ring main body portion 35. In the present embodiment, the outer ring main body portion 35 and the outer ring extension portion 36 are integrated together and are indivisible but may be separate from each other. In other words, the outer ring extension portion 36 may be a ring-shaped spacer.

The balls 23 are interposed between the inner ring main body portion 31 and the outer ring main body portion 35 and roll in the inner ring raceway groove 25 and the outer ring raceway groove 26. The cage 24 includes an annular member and has a plurality of pockets 27 formed along a circumferential direction. The cage 24 has a pair of ring portions and pillar portions that join the ring portions together. In the cage 24, the pockets 27 are each formed between the ring portions and a pair of the pillar portions that are adjacent to each other in the circumferential direction. Each of the balls 23 is housed in a corresponding one of the pockets 27. Thus, the cage 24 can hold the plurality of balls 23 so as to arrange the balls 23 in the circumferential direction. In the present invention, the balls 23 are in contact with the raceway grooves 25 and 26 at a certain contact angle. The bearing portion 20 is an angular ball bearing. When the rolling bearing apparatus 10 is used for a machine tool, the pockets 27 are typically cylindrical.

A first annular space 11 is formed between the inner ring main body portion 31 and the outer ring main body portion 35. A second annular space 12 is formed between the inner ring extension portion 32 and the outer ring extension portion 36. The first annular space 11 and the second annular space 12 are contiguous with each other. A seal member 13 is provided on the first side of the first annular space 11 in the axial direction to prevent a lubricant inside the bearing where the balls 23 and the cage 24 are present from escaping to the exterior of the bearing. Although not depicted in the drawings, a seal member may be provided between the first annular space 11 and the second annular space 12. The seal member may be provided outside the bearing as long as the lubricant inside the bearing can still be prevented from escaping to the exterior.

The balls 23 and the cage 24 are provided in the first annular space 11. The lubrication unit 40 is provided in the second annular space 12. In the present embodiment, the inner ring 21, which is a rotating bearing ring, rotates along with the shaft 7 with respect to the outer ring 22, which serves as a fixed bearing ring. Thus, the lubrication unit 40 is fitted on and attached to an inner peripheral surface of the outer ring extension portion 36 in a close contact manner. In contrast, a very small gap is formed between an outer peripheral surface of the inner ring extension portion 32 and an inner peripheral surface of the lubrication unit 40 (an annular frame 41 described below) to prevent the lubrication unit 40 from hindering rotation of the inner ring 21.

As depicted in FIG. 2, the lubrication unit 40 is generally shaped like a ring. The lubrication unit 40 includes a frame 41, a tank 42, a pump 43, a circuit section 44, and a power supply section 45.

The frame 41 is, for example, an annular member formed of resin and has a short-cylinder-shaped inner peripheral wall 46, a short-cylinder-shaped outer peripheral wall 47, and a plurality of partition walls 48a, 48b, 48c, and 48d provided between the peripheral walls 46 and 47, and sidewalls 48e and 48f (see FIG. 1). The walls define a plurality of spaces K1, K2, and K3 along the circumferential direction.

The first space K1 forms the tank 42. The pump 43 is stored in the second space K2. The circuit section 44 and the power supply section 45 are stored in the third space K3. Thus, the frame 41, the tank 42, the pump 43, the circuit section 44, and the power supply section 45 are integrated to form the lubrication unit 40.

The lubrication unit 40 is detachably attached to the outer ring 22 (outer ring extension portion 36), which serves as the fixed bearing ring. The lubrication unit 40 is integrated with the bearing portion 20. As depicted in FIG. 1, the lubrication unit 40 provided in the second annular space 12 is provided adjacently to the first annular space 11 in the axial direction.

The tank 42 is intended to store a lubricant 3. In the present embodiment, as depicted in FIG. 2, the tank 42 is a space defined by a part of the inner peripheral wall 46, a part of the outer peripheral wall 47, the partition wall 48a, the partition wall 48b, and the sidewalls 48e and 48f (see FIG. 1). The tank 42 has, in a part thereof, an outlet portion (outlet port) 49 through which the stored lubricant 3 flows out to the pump 43. The outlet portion 49 and the pump 43 (a housing portion 51 described below) are joined together through a channel (not depicted in the drawings). In the tank 42, a holding element (for example, a felt or a sponge) may be provided which holds the lubricant 3 The lubricant 3 in the present embodiment is oil, but may be grease.

The power supply section 45 has a power generating section 45a and a secondary battery section 45b. The power generating section 45a is configured such that rotation of the inner ring 21 enables the power generating section 45a to generate power. In other words, a rotor 45a-1 is provided on an outer periphery of the inner ring extension portion 32. The power generating section 45a has a stator 45a-2 provided on an inner periphery of the frame 41. The rotor 45a-1 is magnetized so as to alternately provide N poles and S poles along the circumferential direction. The stator 45a-2 is formed of a magnetic material and is provided such that the rotor 45a-1 passes through a radially inner side of the stator 45a-2. Power generated by the power generating section 45a is stored in the secondary battery section 45b.

The circuit section 44 includes a circuit board including a programmed microcomputer and transmits control signals (driving signals) to the pump 43. In other words, the circuit section 44 provides driving power (applies a predetermined voltage) to the pump 43. The circuit section 44 has a function to execute various processes besides the function to drive the pump 43 (driving control section). For example, the circuit section 44 can acquire a signal from a sensor (not depicted in the drawings) provided in the lubrication unit 40. Based on the signal, the circuit section 44 can execute various processes.

The pump 43 includes a small pump (micro pump) and is attached to a part (lower part) of the frame 41. As depicted in FIG. 1, the pump 43 includes a nozzle 50, a housing portion 51 in which the lubricant 3 is stored, and a piezoelectric element (not depicted in the drawings). When a voltage is applied to the piezoelectric element, the piezoelectric element is deformed (displaced). The deformation reduces the volume of the housing portion 51 to cause the lubricant 3 with which the housing portion 51 is filled to be discharged through the nozzle 50. The application of the voltage to the piezoelectric element and a timing for the application of the voltage are controlled by the circuit section 44. Power applied to the piezoelectric element is supplied by a power supply section 45 (secondary battery section 45b). The application of a pulsed voltage to the piezoelectric element allows the lubricant 3 to be intermittently discharged. A slight amount of lubricant can be discharged by controlling the number of pulses and the value of the voltage applied to the piezoelectric element.

Now, the amount of the lubricant 3 discharged by the pump 43 will be described. When the pump 43 receives a drive signal (control signal) from the circuit section 44, the piezoelectric element is driven to cause the lubricant 3 to be discharged through the nozzle 50 in the form of droplets. A constant (substantially constant) amount of droplet of the lubricant 3 is discharged during a single driving operation of the pump 43 (the piezoelectric element). The amount (volume) of droplet discharged per driving operation (one shot) of the pump 43 may be five picoliters to seven microliters or may be set to one nanoliters to 1,000 nanoliters or five picoliters to 1,000 picoliters. The frequency of the lubrications (time intervals between shots) may be every several seconds, every several minutes, or every several hours. As described above, the pump 43 can intermittently (at time intervals) supply the lubricant 3, in the form of droplets, to the first annular space 11 (see FIG. 1) defined between the inner ring 21 and the outer ring 22. The rolling bearing apparatus 10 with the lubrication unit 40 as described above enables a slight amount of the lubricant 3 to be supplied to the bearing portion 20 and is also referred to as a nano-lubrication bearing.

Figure 3:
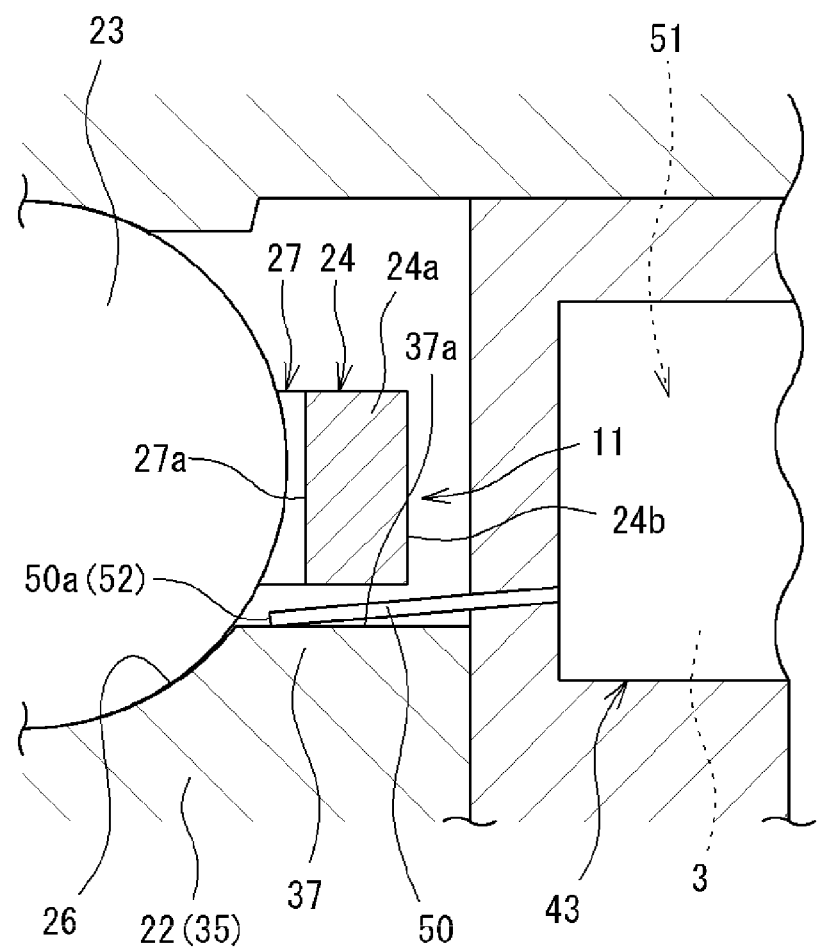
FIG. 3 is a schematic diagram illustrating a pump and a periphery of the pump.
Figure 4:
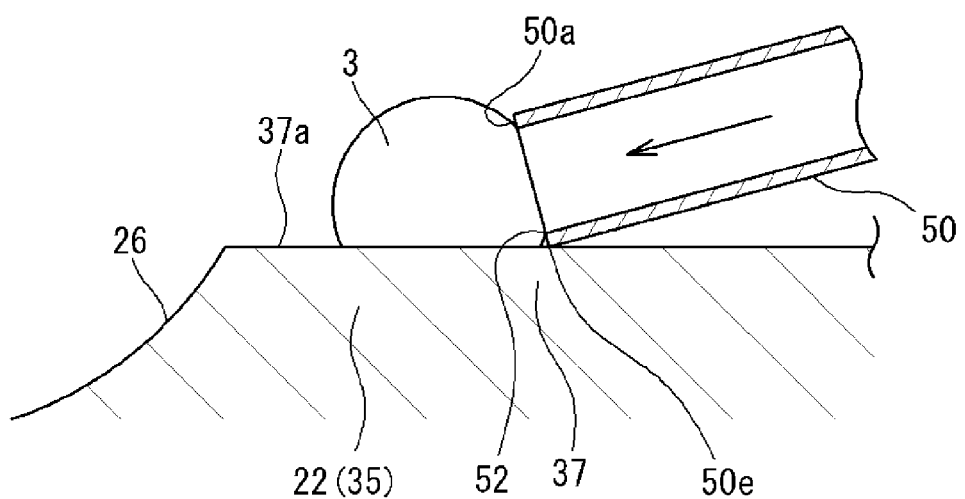
FIG. 4 is an enlarged view illustrating a nozzle of the pump depicted in FIG. 3 and a periphery of the nozzle.

A first form of the pump 43 and the nozzle 50 will be described below. FIG. 3 is a schematic diagram of the pump 43 and a periphery of the pump 43. FIG. 4 is an enlarged view of the nozzle 50 of the pump 43 depicted in FIG. 3 and a periphery of the nozzle 50. The pump 43 is driven to discharge the lubricant 3 in the pump 43 (housing portion 51) through the nozzle 50. The nozzle 50 is shaped like a needle and has a discharge port 52 at a tip 50a of the nozzle 50. The discharge port 52 is open in the tip 50a (tip surface) of the nozzle 50, and the lubricant 3 is discharged through the discharge port 52 toward an outer ring raceway groove 26 in the outer ring 22, which is a fixed bearing ring. A longitudinal direction of the nozzle 50 is present on a plane including a center line of the rolling bearing apparatus 10.

As depicted in FIG. 4, an outer peripheral edge 50e of the tip 50a of the nozzle 50 is in contact with a peripheral surface adjacent to the outer ring raceway groove 26. The peripheral surface with which the outer peripheral edge 50e is in contact is an inner peripheral surface of a shoulder portion 37 of the outer ring 22 (outer ring main body portion 35). The inner peripheral surface is hereinafter referred to as a shoulder portion inner peripheral surface 37a. Thus, the outer peripheral edge 50e of the tip 50a of the nozzle 50 through which the lubricant 3 is discharged is in contact with the shoulder portion inner peripheral surface 37a adjacent to the outer ring raceway groove 26. Consequently, a slight amount of the lubricant 3 discharged through the nozzle 50 (discharge port 52) can flow along the shoulder portion inner peripheral surface 37a to the outer ring raceway groove 26. In other words, even a slight amount of the lubricant 3 can be efficiently supplied to the outer ring raceway groove 26.

Figure 5:
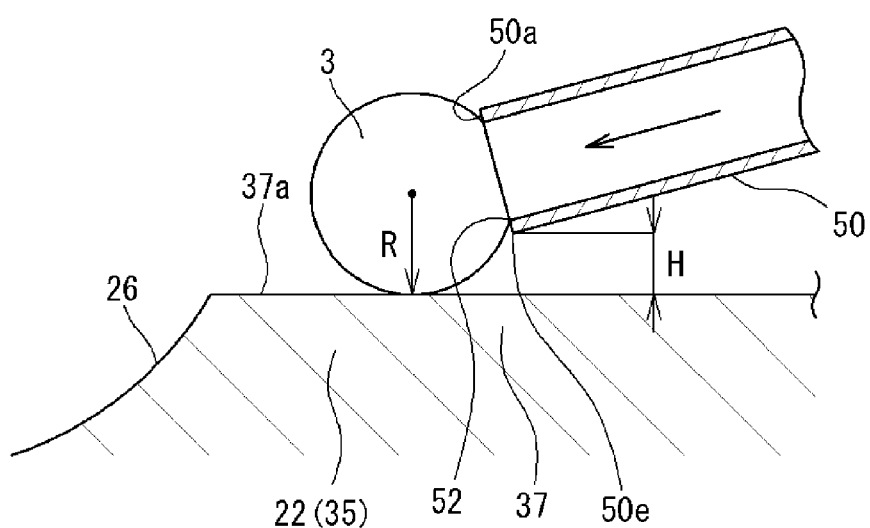
FIG. 5 is an enlarged view illustrating the nozzle of the pump and the periphery of the nozzle.

A second form of the pump 43 and the nozzle 50 will be described below. FIG. 5 is an enlarged view of the nozzle 50 of the pump 43 and the periphery of the nozzle 50. The second form and the first form are different in the relative positions of the nozzle 50 and the shoulder portion inner peripheral surface 37a but are the same in the other aspects such as the shape of the nozzle 50. In the form depicted in FIG. 5, (the outer peripheral edge 50e of) the tip 50a of the nozzle 50 is provided close to the shoulder portion inner peripheral surface 37a adjacent to the outer ring raceway groove 26 such that a very small gap 14 is formed between the tip 50a and the shoulder portion inner peripheral surface 37a. Also in this form, a slight amount of the lubricant 3 discharged through the nozzle 50 (discharge port 52) can flow along the shoulder portion inner peripheral surface 37a to the outer ring raceway groove 26. In other words, even a slight amount of the lubricant 3 can be efficiently supplied to the outer ring raceway groove 26.

The very small gap H will be described. The very small gap H has such a size as to enable droplets of the lubricant 3 discharged through the tip 50a (discharge port 52) of the nozzle 50 and adhering to the tip 50a (tip surface) to come into contact with the shoulder portion inner peripheral surface 37a. As described above, the pump 43 discharges the lubricant 3 in the form of droplets, and a constant amount of droplet is discharged during a single discharging operation. When the constant amount of droplet is assumed to be a sphere, the radius R (see FIG. 5) of the droplet is determined. The shape (diameter) of the tip 50a of the nozzle 50 is also known. Thus, under the condition that a droplet with the radius R adhering to the tip 50a comes into contact with the inner peripheral surface 37a of the shoulder portion 37, the value for the size of the very small gap H is determined. A specific example of the size of the very small gap H is less than 1 millimeter.

Figure 6:
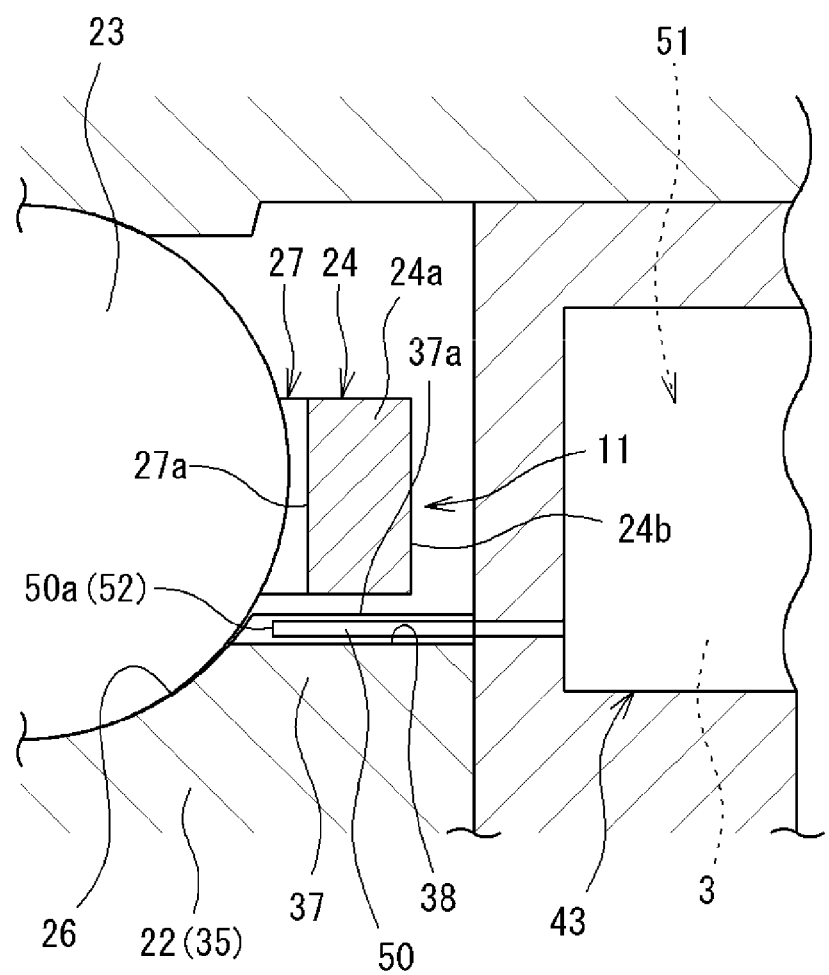
FIG. 6 is a schematic diagram illustrating the pump and the periphery of the pump.
Figure 7:
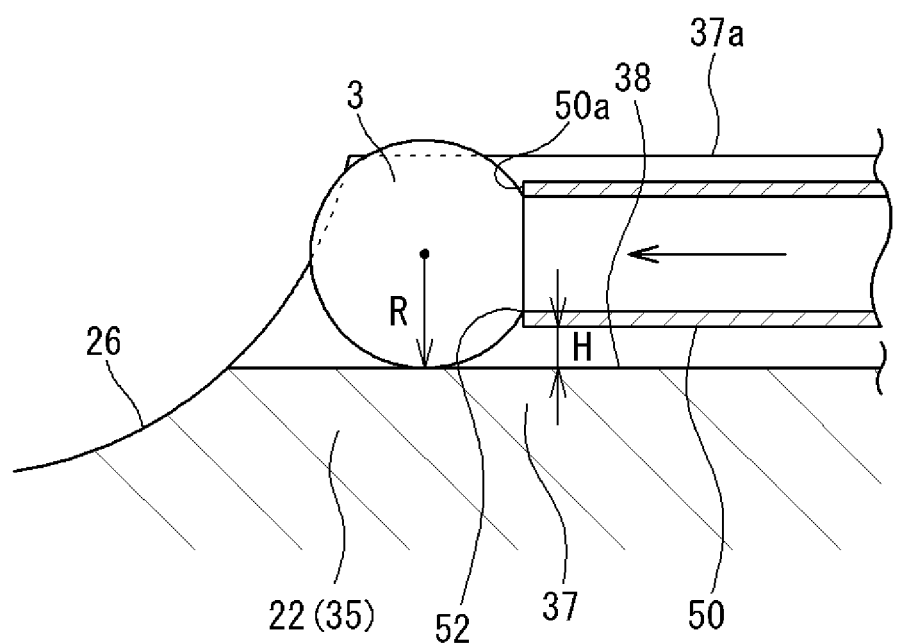
FIG. 7 is a an enlarged view illustrating the nozzle of the pump depicted in FIG. 6 and the periphery of the nozzle.

A third form of the pump 43 and the nozzle 50 will be described below. FIG. 6 is an enlarged view of the nozzle 50 of the pump 43 and the periphery of the nozzle 50. FIG. 7 is an enlarged view of the nozzle 50 of the pump 43 depicted in FIG. 6 and the periphery of the nozzle 50. The third form is a modification of the second form and has the very small gap H. As depicted in FIG. 6 and FIG. 7, a groove 38 is formed in the shoulder portion inner peripheral surface 37a. The groove 38 is contiguous with the outer ring raceway groove 26 and extends in the axial direction. The sectional shape of the groove 38 is, for example, a semicircle. The nozzle 50 is housed in the groove 38.

In the third form, the longitudinal direction of the nozzle 50 is parallel to the shoulder portion inner peripheral surface 37a and also to the center line of the bearing portion 20. However, even in a form in which the nozzle 50 is inclined to the shoulder portion inner peripheral surface 37a (first form) as depicted in FIG. 4, the groove 38 contiguous with the outer ring raceway groove 26 may be formed in the shoulder portion inner peripheral surface 37a, though this is not depicted in the drawings. In this case, at least the tip 50a of the nozzle 50 may be housed in the groove 38.

As described above, at least the tip 50a of the nozzle 50 is housed in the groove 38 contiguous with the outer ring raceway groove 26. Consequently, the lubricant 3 discharged through the discharge port 52 is guided through the groove 38 to flow smoothly to the outer ring raceway groove 26. In other words, the lubricant 3 can be more reliably supplied to the outer ring raceway groove 26.

As depicted in FIG. 6, the groove 38 is formed in a part of the shoulder portion inner peripheral surface 37a, which includes an area facing an outer peripheral surface of a ring portion 24a of the cage 24. In the present embodiment, the groove 38 is linearly formed along the entire length of the shoulder portion inner peripheral surface 37a in the axial direction. As depicted in FIG. 6 and FIG. 7, the nozzle 50 is housed in the groove 38 along a longitudinal direction of the groove 38 and configured so as not to stick out from the groove 38. In this configuration, even when the gap between the outer ring 22 and the cage 24 (ring portion 24a) in a radial direction is small, the nozzle 50 can be provided along the groove 38 as depicted in FIG. 6. Moreover, positioning of the cage 24 in the radial direction can be carried out using the outer ring 22. In other words, the cage 24 (ring portion 24a) can be brought into slidable contact with a part of the inner peripheral surface (shoulder portion inner peripheral surface 37a) of the outer ring 22 and guided by the outer ring 22. Furthermore, the lubricant 3 fed through the nozzle 50 can enter a gap between an outer peripheral surface of the cage 24 and the inner peripheral surface (55 shoulder portion inner peripheral surface 37a) of the outer ring 22. When these surfaces serve as slidable contact surfaces, the lubricant 3 can contribute to the lubrication of the surfaces.

Another form (1) of the pump 43 and the nozzle 50 will be described below. The rolling bearing apparatus 10 in the above-described forms can be used in the atmosphere and also in a vacuum. If the rolling bearing apparatus 10 is used in the atmosphere, that is, if air is present in the first annular space 11 in FIG. 3 or FIG. 6, when the balls 23 and the cage 24 rotate in conjunction with rotation of the inner ring 21, a vortex flow occurs in the first annular space 11. Consequently, an air curtain is generated in the vicinity of an axial end surface 24b of the cage 24.

The opening of the discharge port 52 of the nozzle 50 is positioned more toward the balls 23 than the axial end surface 24b of the cage 24, with respect to the axial direction, that is, positioned to the left of the end surface 24b in FIG. 3 or FIG. 6. If the opening of the discharge port 52 of the nozzle 50 is positioned outside the axial end surface 24b of the cage 24 (away from the balls 23), that is, positioned to the right of the end surface 24b in FIG. 3 or FIG. 6, the entering, into the bearing, of droplets of the lubricant 3 discharged through the discharge port 52 is hindered by the air curtain. However, in the above-described configuration depicted in FIG. 3 or FIG. 6, droplets of the lubricant 3 discharged through the discharge port 52 are less likely to be affected by the air curtain and smoothly reach the outer ring raceway groove 26.

The position of the opening of the discharge port 52 in the axial direction will further be described. The opening is preferably positioned more toward the balls 23 than an outer pocket surface 27a of a pocket 27 of the cage 24 with respect to the axial direction. This serves to further avoid the influence of the air curtain and reduces the distance between the discharge port 52 and the outer ring raceway groove 26. Consequently, the lubricant 3 can be efficiently supplied to the outer ring raceway groove 26.

Figure 8:
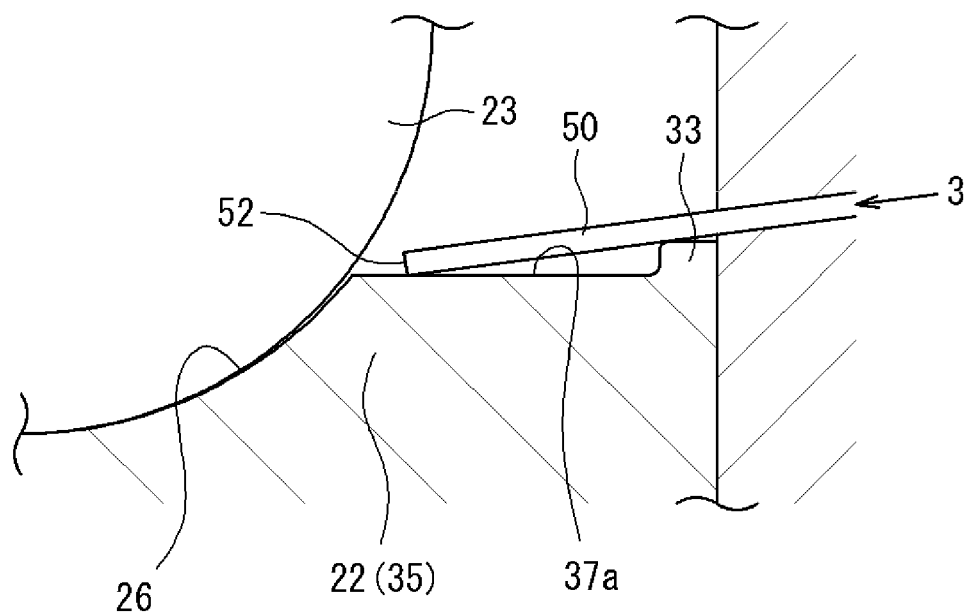
FIG. 8 is a schematic diagram (2) illustrating a shoulder portion inner peripheral surface of an outer ring and a periphery of the shoulder portion inner peripheral surface.

Another form (2) of the pump 43 and the nozzle 50 will be described below. FIG. 8 is a schematic diagram (2) illustrating the shoulder portion inner peripheral surface 37a of the outer ring 22 (outer ring main body portion 35) and a periphery of the shoulder portion inner peripheral surface 37a. The shoulder portion inner peripheral surface 37a of the outer ring main body portion 35 is provided with a protruding portion 33 protruding inward in the radial direction. The protruding portion 33 is positioned outside the discharge port 52 in the axial direction (to the right of the discharge port 52 in FIG. 8). In other words, in regard to the position in the axial direction, the discharge port 52 is positioned between the outer ring raceway groove 26 and the protruding portion 33. The protruding portion 33 is shaped continuously along the circumferential direction and forms a ring-like wall.

The protruding portion 33 enables a flow of the lubricant 3 discharged through the discharge port 52 to be regulated even if the lubricant 3 flows outward (rightward in FIG. 8) in the axial direction. Consequently, the lubricant 3 can be prevented from escaping to the exterior of the bearing. FIG. 8 depicts a form in which the nozzle 50 is inclined to the shoulder portion inner peripheral surface 37a (the above-described first form). However, the configuration for the protruding portion 33 is applicable to the rolling bearing apparatus 10 in any of the above-described forms.

Figure 9:
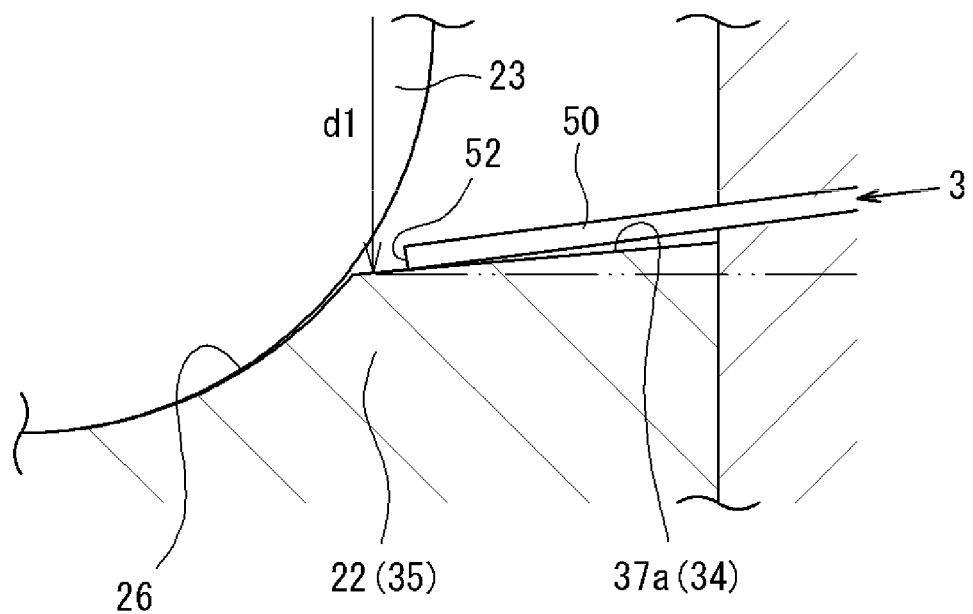
FIG. 9 is a schematic diagram (3) illustrating the shoulder portion inner peripheral surface of the outer ring and the periphery of the shoulder portion inner peripheral surface.

Another form (3) of the pump 43 and the nozzle 50 will be described below. FIG. 9 is a schematic diagram (3) illustrating the shoulder portion inner peripheral surface 37a of the outer ring 22 (outer ring main body portion 35) and the periphery of the shoulder portion inner peripheral surface 37a. The shoulder portion inner peripheral surface 37a in the above-described forms is a cylindrical surface parallel to the center line of the rolling bearing apparatus 10. However, in the form depicted in FIG. 9, the shoulder portion inner peripheral surface 37a is a tapered surface inclined to the center line of the rolling bearing apparatus 10. In particular, in the present embodiment, the shoulder portion inner peripheral surface 37a has an inclined surface 34 with a diameter (inner diameter) d1 increasing toward the outer ring raceway groove 26.

This configuration enables the inclined surface 34 to regulate the flow of the lubricant 3 discharged through the discharge port 52 even if the lubricant 3 attempts to flow outward in the axial direction (rightward in FIG. 8). Consequently, the lubricant 3 can be prevented from escaping to the exterior of the bearing. The inclined surface 34 also has a function to guide the lubricant 3 along the inclined surface 34 to the outer ring raceway groove 26. FIG. 9 depicts a form in which, with respect to the shoulder portion inner peripheral surface 37a inclined to the center line of the rolling bearing apparatus 10, the nozzle 50 is further inclined (the above-described first form). However, the configuration for the inclined surface 34 is applicable to the rolling bearing apparatus 10 in any of the above-described forms.

Figure 10:
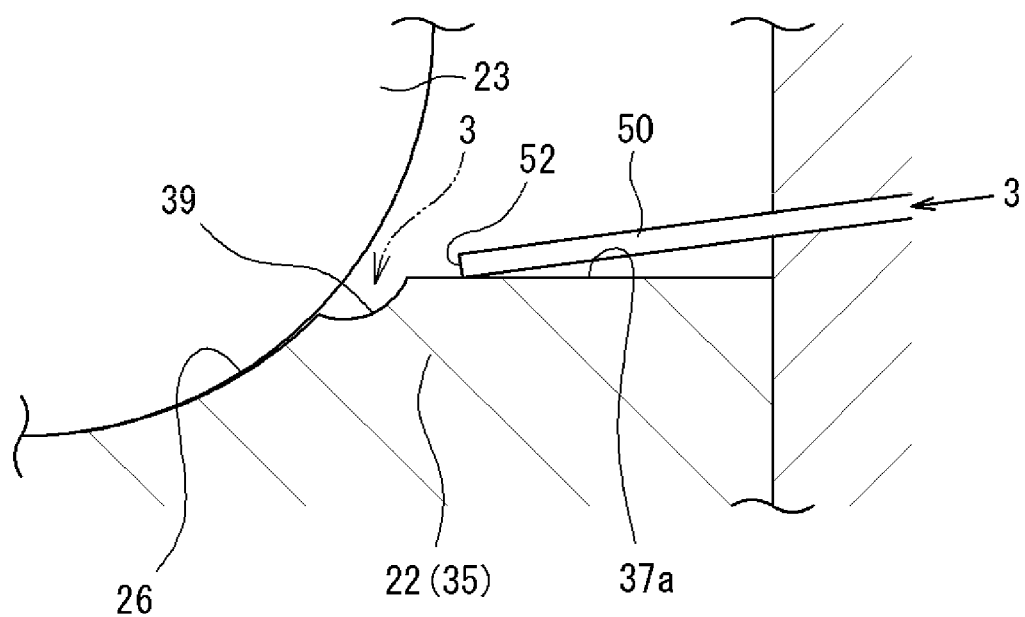
FIG. 10 is a schematic diagram (4) illustrating the shoulder portion inner peripheral surface of the outer ring and the periphery of the shoulder portion inner peripheral surface.

Another form (4) of the pump 43 and the nozzle 50 will be described below. FIG. 10 is a schematic diagram (4) illustrating the shoulder portion inner peripheral surface 37*a* of the outer ring 22 (outer ring main body portion 35) and the periphery of the shoulder portion inner peripheral surface 37*a*. As depicted in FIG. 10, a recess portion 39 in which the lubricant 3 is stored is formed at a boundary portion between the shoulder portion inner peripheral surface 37*a* and the outer ring raceway groove 26. The recess portion 39 may be annularly shaped but may be formed only in a part of the outer ring 22 in the circumferential direction. The annular recess portion 39 is a circumferentially continuous recessed groove. The circumferentially partial recess portion 39 is formed at the same position as the position of the nozzle 50 in the circumferential direction.

The lubricant 3 discharged through the discharge port 52 is caught in the recess portion 39 and can thus be prevented from escaping to the exterior of the bearing. As a result, the lubricant 3 can be efficiently supplied to the outer ring raceway groove 26. FIG. 10 depicts a form in which the nozzle 50 is inclined to the shoulder portion inner peripheral surface 37*a* (the above-described first form). However, the configuration for the recess portion 39 is applicable to the rolling bearing apparatus 10 in any of the above-described forms.

Figure 11:
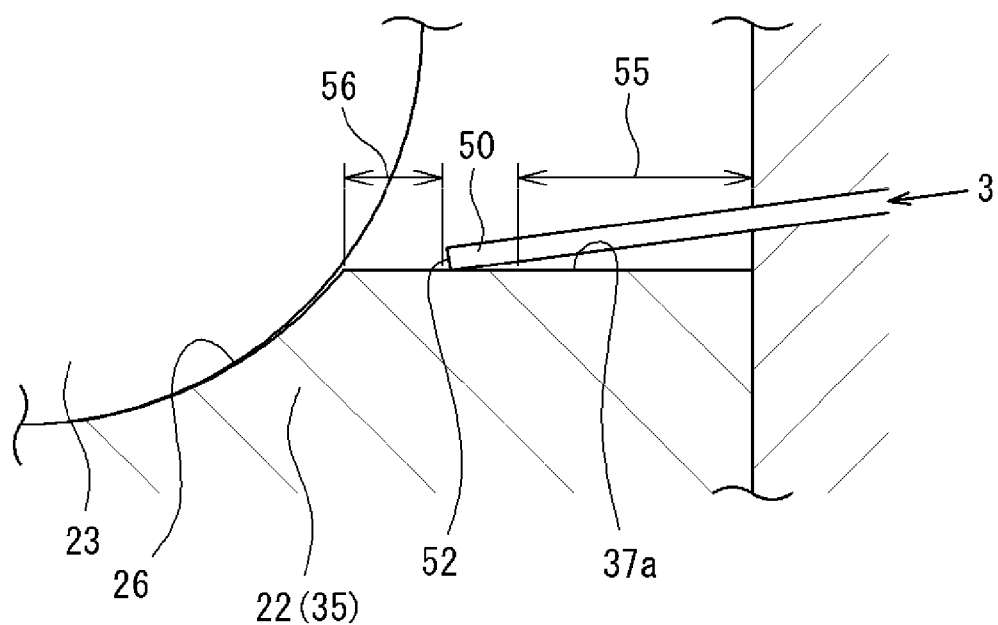
FIG. 11 is a schematic diagram (5) illustrating the shoulder portion inner peripheral surface of the outer ring and the periphery of the shoulder portion inner peripheral surface.

Another form (5) of the pump 43 and the nozzle 50 will be described below. FIG. 11 is a schematic diagram (5) illustrating the shoulder portion inner peripheral surface 37*a* of the outer ring 22 (outer ring main body portion 35) and the periphery of the shoulder portion inner peripheral surface 37*a*. As depicted in FIG. 11, a lubricant repellant portion 55 is provided on a part of the shoulder portion inner peripheral surface 37*a*. The lubricant repellant portion 55 has the property of repelling the lubricant 3 discharged through the discharge port 52. The lubricant repellant portion 55 is provided in an area of the shoulder portion inner peripheral surface 37*a*, which is located outside the discharge port 52 in the axial direction (located to the right of the discharge port 52 in FIG. 11). The lubricant repellant portion 55 is provided along the entire circumference of the shoulder portion inner peripheral surface 37*a*. The lubricant repellant portion 55 may be formed of a resin film (a film of a fluorine resin) formed in a part of the shoulder portion inner peripheral surface 37*a*.

This configuration enables the lubricant repellant portion 55 to regulate the flow of the lubricant 3 discharged through the discharge port 52 even if the lubricant 3 attempts to flow outward in the axial direction (rightward in FIG. 11). Consequently, the lubricant 3 can be prevented from escaping to the exterior of the bearing.

Furthermore, as depicted in FIG. 11, a lipophillic portion 56 is provided in another part of the shoulder portion inner peripheral surface 37*a*. The lipophillic portion 56 exhibits lipophilicity for the lubricant 3 discharged through the discharge port 52. The lipophillic portion 56 is provided in an area of the shoulder portion inner peripheral surface 37*a*, which is located more toward the outer ring raceway groove 26 than the discharge port 52 (located to the left of the discharge port 52 in FIG. 11). The lipophillic portion 56 is provided along the entire circumference of the shoulder portion inner peripheral surface 37*a*. The lipophillic portion 56 may be formed of, for example, a film of grease (a film of grease thickener). Then, the lipophillic portion 56 can be obtained by applying grease to the shoulder portion inner peripheral surface 37*a* when the rolling bearing apparatus 10 is assembled.

In this configuration, the lubricant 3 discharged through the discharge port 52 is drawn toward the outer ring raceway groove 26 by the lipophillic portion 56 and can thus be more reliably supplied to the outer ring raceway groove 26. FIG. 11 depicts a form in which the nozzle 50 is inclined to the shoulder portion inner peripheral surface 37*a* (the above-described first form). However, the configuration for the lubricant repellant portion 55 and the lipophillic portion 56 is applicable to the rolling bearing apparatus 10 in the above-described forms.

Figure 12:
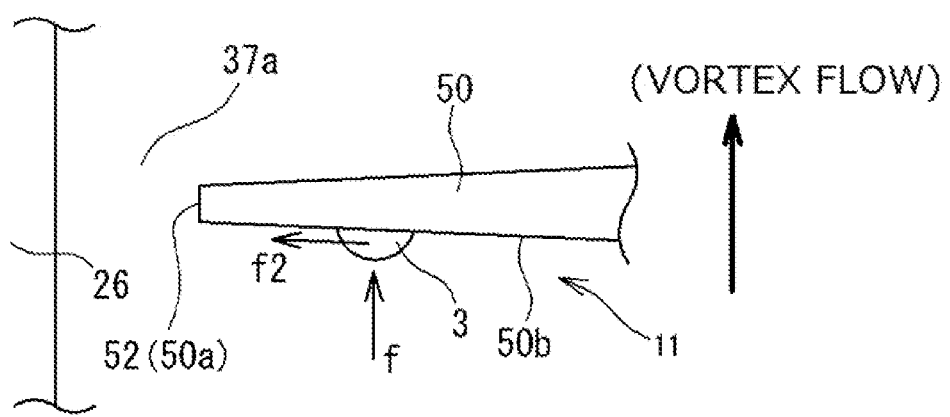
FIG. 12 is an enlarged view of the nozzle as seen in a radial direction.

Another form (6) of the pump 43 and the nozzle 50 will be described below. FIG. 12 is an enlarged view of the nozzle 50 as seen in the radial direction. The nozzle 50 may be a linear needle member with a uniform transverse section (diameter) along the longitudinal direction. However, as depicted in FIG. 12, the nozzle 50 may be tapered such that the transverse section (diameter) decreases toward the tip 50*a*. A channel that is formed in the nozzle 50 and that is open at the tip 50*a* (the channel through which the lubricant 3 flows) may be tapered or may be linear.

Thus, with the nozzle 50 with a tapered outer peripheral surface 50*b*, when the lubricant 3 adheres to the outer peripheral surface 50*b*, an effect can be produced which allows the lubricant 3 (droplets) to be collected at the tip 50*a* of the nozzle 50, as described below. That is, when air is present in the first annular space 11 (see, for example, FIG. 1) between the inner ring 21 and the outer ring 22, rotation of the balls 23 and the cage 24 in conjunction with rotation of the inner ring 21 results in a vortex flow in the first annular space 11 as described above. While a vortex flow is occurring, contact of the vortex flow f with the outer peripheral surface 50*b* of the nozzle 50 changes a portion of the vortex flow f into a flow f2 traveling along the longitudinal direction of the nozzle 50 toward the tip 50*a* as depicted in FIG. 12. This produces an effect that allows the lubricant 3 (droplets) to be collected at the tip 50*a* of the nozzle 50. As a result, the lubricant 3 (droplets) can be efficiently supplied to the outer ring raceway groove 26.

The rolling bearing apparatus 10 in the above-described forms will be described. In the rolling bearing apparatus 10 in the above-described forms, rotation of the rotating bearing ring (the inner ring 21 in the above-described forms) causes in the first annular space 11 a vortex flow of the gas (air) in the same direction as the rotating direction of the cage 24. When a slight amount of the lubricant 3 is discharged into the first annular space 11 (air) where such a vortex flow occurs, the slight amount of the lubricant 3 may be affected by the vortex flow and fail to adhere to the raceway surface and the rolling elements as expected.

However, in the rolling bearing apparatus 10 in the above-described forms, the outer peripheral edge 50*e* of the tip 50*a* of the nozzle 50 through which the lubricant 3 is discharged is in contact with the shoulder portion inner peripheral surface 37*a* adjacent to the outer ring raceway groove 26 of the outer ring 22. Alternatively, the tip 50*a* of the nozzle 50 is provided close to the shoulder portion inner peripheral surface 37*a* adjacent to the outer ring raceway groove 26 of the outer ring 22 such that the very small gap H is formed between the tip 50*a* and the shoulder portion inner peripheral surface 37*a*. Thus, the slight amount of the lubricant 3 discharged through the nozzle 50 (discharge port 52) flows smoothly along the shoulder portion inner peripheral surface 37*a* to the outer ring raceway groove 26. In other words, the flow of the lubricant 3 can be made unsusceptible to the environment of the first annular space 11. As a result, the lubricant 3 can be efficiently supplied to the outer ring raceway groove 26.

In particular, as depicted in FIG. 7, the groove 38 is formed in the shoulder portion inner peripheral surface 37a, onto which the lubricant 3 is discharged through the nozzle 50. When the at least the tip 50a of the nozzle 50 is housed in the groove 38, the lubricant 3 discharged through the tip 50a is more unsusceptible to the vortex flow. This allows the lubricant 3 to be efficiently supplied to the outer ring raceway groove 26.

As described above, even a slight amount of the lubricant 3 can be efficiently supplied to the outer ring raceway groove 26. Allowing the efficient supply of the lubricant 3 enables a reduction in the size of the tank 42 and thus in the size of the lubrication unit 40. In other words, a structure is obtained which facilitates housing of the lubrication unit 40 in the rolling bearing apparatus 10 along with the bearing portion 20. Furthermore, the rolling bearing apparatus 10 needs no maintenance for an extended period of time and can be used with a low environmental load that involves only a small amount of the lubricant 3 scattering.

Another form of the rolling bearing apparatus 10 (1) will be described below. In the above-described forms, the case has been described where the rotating bearing ring is the inner ring 21, whereas the fixed bearing ring is the outer ring 22. However, it is also preferable that the rotating bearing ring be the outer ring 22, whereas the fixed bearing ring be the inner ring 21. In this case, the nozzle 50 is in contact with a peripheral surface (shoulder portion outer peripheral surface) adjacent to an inner ring raceway groove 25. Alternatively, the nozzle 50 is provided close to the peripheral surface (shoulder portion outer peripheral surface) adjacent to the inner ring raceway groove 25 such that a very small gap is formed between the nozzle 50 and the peripheral surface. When the tip 50a of the nozzle 50 is provided adjacent to the inner ring 21 (inner ring main body portion 31), the groove 38 in the shoulder portion inner peripheral surface 37a (see FIG. 7), the protruding portion 33 (see FIG. 8), and the like may be formed as needed on the peripheral surface (shoulder portion outer peripheral surface) of the inner ring 21 at which the nozzle 50 is installed.

The rolling bearing apparatus 10 in the above-described forms may be used in the atmosphere but may be used in a vacuum where no such vortex flow as described above occurs. Moreover, although not depicted in the drawings, the rolling bearing apparatus 10 may further include, in the frame 41, various sensors that detect temperature, vibration, an oil film condition on the raceway surface, and the like so that the circuit section 44 can determine (change) driving conditions (the amount of lubricant 3 discharged by a single operation and discharge intervals) for the pump 43 based on detection signals from the sensors.

Another form of the rolling bearing apparatus 10 (2) will be described below. In the above-described embodiments, the lubrication unit 40 is integrated with the bearing portion 20 to provide the rolling bearing apparatus 10. However, the lubrication unit 40 may be used with another component or the like. For example, the lubrication unit 40 may be combined with a rotating component such as a one-way clutch or a ball screw. In this case, the lubrication unit 40 is provided adjacently to a lubrication-needed area of the rotating component to supply the lubricant 3 to the lubrication-needed area. The lubrication unit 40 includes the pump 43 that supplies the lubricant 3 to the lubrication—needed area as is the case with the above-described forms. The pump 43 includes the needle-like nozzle 50 having, at the tip 50a thereof, the discharge port 52 through which the lubricant 3 is discharged toward the lubrication-needed area. The outer peripheral edge 50e of the tip 50a of the nozzle 50 is in contact with the surface adjacent to the lubrication-needed area. Alternatively, the tip 50a of the nozzle 50 is provided close to the surface adjacent to the lubrication-needed area such that a very small gap is formed between the tip 50a and the surface.

The rolling bearing apparatus 10 and the lubrication unit 40 in the present invention are not limited to the illustrated forms but may be in any other form within the scope of the present invention. For example, in the above-described embodiments, the case has been described where the lubrication unit 40 includes the power supply section 45 in the frame 41. However, the power supply section 45 may be provided outside the frame 41. In this case, the circuit section 44 (pump 43) in the frame 41 and the external power supply section 45 are connected together through a cable. The tank 42 may also be provided outside the frame 41. In this case, the tank 42 and the pump 43 are connected together through piping. When the tank 42 is provided outside the frame 41, the tank 42 may be installed, for example, on a spacer arranged near the bearing portion 20, inside the bearing housing 8, or outside the bearing housing 8. Furthermore, in the above-described embodiments of the rolling bearing apparatus 10, the bearing portion 20 is a ball bearing. However, the bearing portion 20 may be a roller bearing.

The rolling bearing apparatus of the present invention allows the lubricant to be efficiently supplied to the raceway surface. The lubrication unit of the present invention allows the lubricant to be efficiently supplied to the lubrication-needed area.

What is claimed is:

1. A rolling bearing apparatus comprising:
a bearing portion having an inner ring with a raceway surface on an outer periphery thereof, an outer ring with a raceway surface on an inner periphery thereof, a plurality of rolling elements interposed between the inner ring and the outer ring and rolling on the raceway surfaces, and a cage that holds the rolling elements such that the rolling elements are arranged in a circumferential direction; and
a lubrication unit having a pump that supplies a lubricant to an annular space formed between the inner ring and the outer ring, the lubrication unit being provided adjacently to the annular space, wherein
the pump includes a needle-like nozzle having, at a tip thereof, a discharge port through which the lubricant is discharged toward the raceway surface of a non-rotating fixed bearing ring of the inner ring and the outer ring, and
a tip of the nozzle is in contact with a peripheral surface adjacent to the raceway surface.

2. The rolling bearing apparatus according to claim 1, wherein an opening of the discharge port is positioned more toward the rolling elements than an axial end surface of the cage with respect to an axial direction.

3. The rolling bearing apparatus according to claim 1, wherein a protruding portion protruding in the radial direction is provided on the peripheral surface of the fixed bearing ring at a position outside the discharge port in the axial direction.

4. The rolling bearing apparatus according to claim 1, wherein the peripheral surface has an inclined surface with a diameter increasing toward the raceway surface.

5. The rolling bearing apparatus according to claim 1, wherein a recess portion in which the lubricant is stored is formed at a boundary portion between the peripheral surface and the raceway surface.

6. The rolling bearing apparatus according to claim 1, wherein a lubricant repellant portion that has a property of repelling the lubricant is provided in an area of the peripheral surface, which is outside the discharge port in the axial direction.

7. The rolling bearing apparatus according to claim 1, wherein a lipophillic portion that exhibits lipophilicity for the lubricant is provided in an area of the peripheral surface, which is more toward the raceway surface than the discharge port.

8. The rolling bearing apparatus according to claim 1, wherein the nozzle is tapered.

9. The rolling bearing apparatus according to claim 1, wherein a groove that is contiguous with the raceway surface is formed in the peripheral surface, and
at least the tip of the nozzle is housed in the groove.

10. The rolling bearing apparatus according to claim 9, wherein the groove is formed in a part of the peripheral surface that includes an area facing the cage in a radial direction, and
the nozzle is housed in the groove along a longitudinal direction of the groove so as not to stick out from the groove.

11. The rolling bearing apparatus according to claim 9, wherein an opening of the discharge port is positioned more toward the rolling elements than an axial end surface of the cage with respect to an axial direction.

12. The rolling bearing apparatus according to claim 9, wherein a protruding portion protruding in the radial direction is provided on the peripheral surface of the fixed bearing ring at a position outside the discharge port in the axial direction.

13. The rolling bearing apparatus according to claim 9, wherein a lubricant repellant portion that has a property of repelling the lubricant is provided in an area of the peripheral surface, which is outside the discharge port in the axial direction.

14. The rolling bearing apparatus according to claim 9, wherein a lipophillic portion that exhibits lipophilicity for the lubricant is provided in an area of the peripheral surface, which is more toward the raceway surface than the discharge port.

15. A lubrication unit provided adjacently to a lubrication-needed area of a rotating component to supply a lubricant to the lubrication-needed area, the lubrication unit comprising:
a pump that supplies the lubricant to the lubrication-needed area, the pump including a needle-like nozzle having, at a tip thereof, a discharge port through which the lubricant is discharged toward the lubrication-needed area, wherein
a tip of the nozzle is in contact with a surface adjacent to the lubrication-needed area.

16. A rolling bearing apparatus comprising:
a bearing portion having an inner ring with a raceway surface on an outer periphery thereof, an outer ring with a raceway surface on an inner periphery thereof, a plurality of rolling elements interposed between the inner ring and the outer ring and rolling on the raceway surfaces, and a cage that holds the rolling elements such that the rolling elements are arranged in a circumferential direction; and
a lubrication unit having a pump that supplies a lubricant to an annular space formed between the inner ring and the outer ring, the lubrication unit being provided adjacently to the annular space, wherein
the pump includes a needle-like nozzle having, at a tip thereof, a discharge port through which the lubricant is discharged toward the raceway surface of a non-rotating fixed bearing ring of the inner ring and the outer ring,
a tip of the nozzle is in contact with a peripheral surface adjacent to the raceway surface or is provided close to the peripheral surface adjacent to the raceway surface such that a very small gap is formed between the tip and the peripheral surface,
a groove that is contiguous with the raceway surface is formed in the peripheral surface, and
at least the tip of the nozzle is housed in the groove.

* * * * *